United States Patent [19]

Blanc et al.

[11] Patent Number: 4,486,695
[45] Date of Patent: Dec. 4, 1984

[54] PROFILE MEASUREMENT CONTROL FOR A GEAR MEASURING MACHINE

[75] Inventors: Guy-Francois Blanc, Zurich; Hans Spaeth, Kloten, both of Switzerland

[73] Assignee: Maag Gear-Wheel & Machine Company Limited, Zurich, Switzerland

[21] Appl. No.: 460,493

[22] Filed: Jan. 24, 1983

[30] Foreign Application Priority Data

Feb. 1, 1982 [CH] Switzerland .......................... 580/82

[51] Int. Cl.³ .............................................. G05B 1/06
[52] U.S. Cl. .................................. 318/663; 318/576; 318/602; 409/61
[58] Field of Search ............... 318/663, 578, 576, 602, 318/571, 685; 409/61; 364/474, 475; 346/33 MC

[56] References Cited

U.S. PATENT DOCUMENTS 3,700,994 10/1972 Gopfert .......................... 318/663 X
4,170,850 10/1979 Horvath et al. ................. 318/578 X
4,224,561 9/1980 Handte .......................... 318/571 X
4,276,503 6/1981 Peiffert et al. .................. 318/578 X Primary Examiner—B. Dobeck
Attorney, Agent, or Firm—Werner W. Kleeman

[57] ABSTRACT

The profile measurement control comprises a potentiometer adjustable by means of a lever. The voltage tapped-off the potentiometer is attenuated via a resistance network proportional to the radius of the base circle disc and additionally via an encoding switch and a voltage attenuating circuit when a certain pre-selected diagram length transmission or translation is exceeded. Thus a voltage is always supplied to the drive motor driving a generating carriage or slide which ensures for an optimum paper feed rate when the lever is located to engage a stop. Hence, the lever can be always adjusted to engage the stop without the preselected diagram length translation or the radius of the selected base circle disc having to be taken into account. Consequently, the measuring rate during series testing of gear profiles can be considerably increased.

6 Claims, 4 Drawing Figures

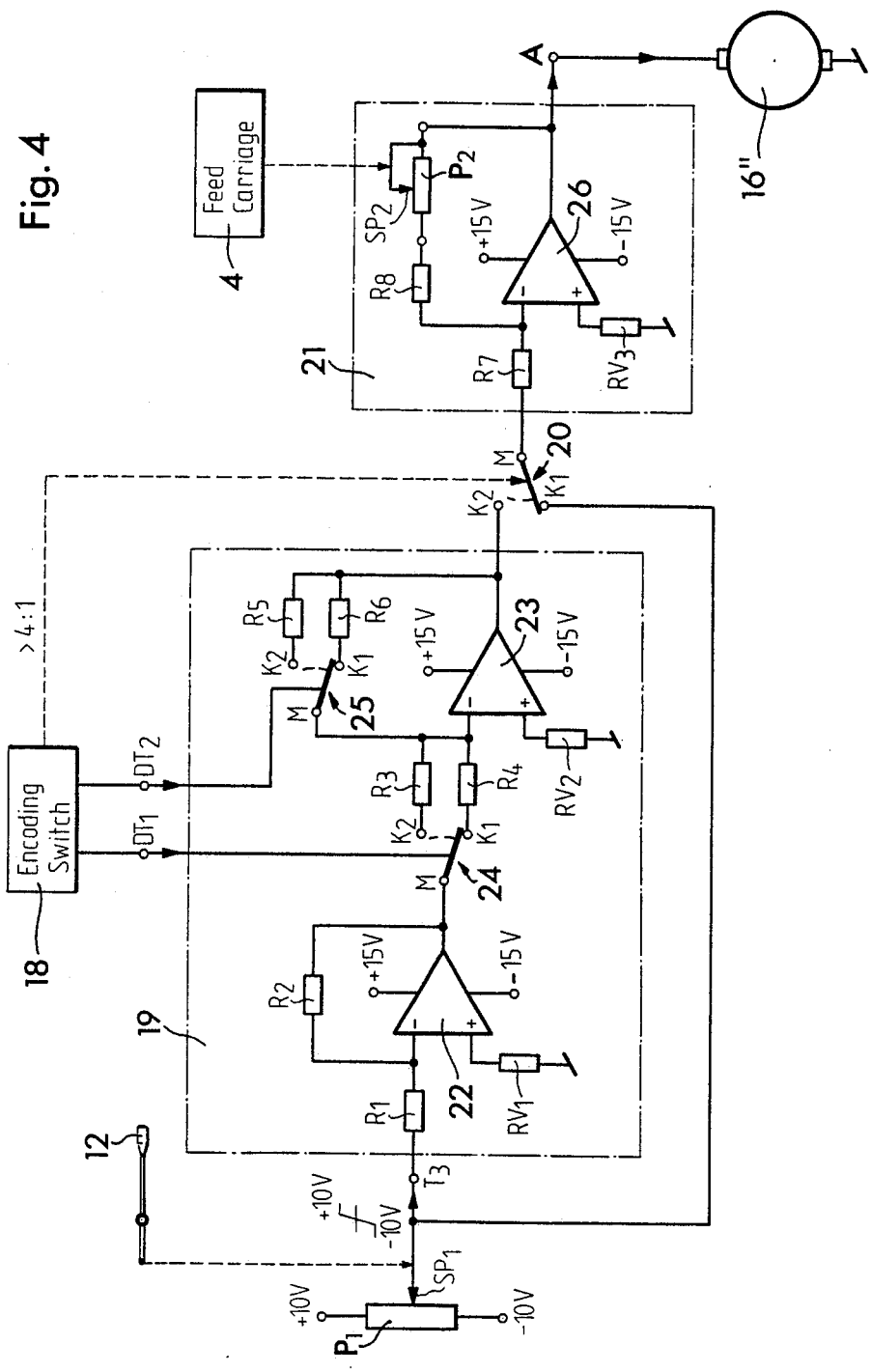

PROFILE MEASUREMENT CONTROL FOR A GEAR MEASURING MACHINE

BACKGROUND OF THE INVENTION

The present invention relates to a new and improved profile measurement control or control apparatus for a gear measuring or testing machine.

In its more particular aspects, the profile measurement control of the present development is of the type comprising a pivotable lever for infinitely controlling the direction and the speed of a drive motor for driving a generating slide or carriage carrying a generating straight edge at which a base circle disc coupled to the test specimen and pressed against the generating straight edge by a feed carriage or slide may roll without slipping. There are also provided an incremental angle transmitter coupled to the base circle disc and a measuring and recording means or device including a recording chart and recording chart feed means comprising a stepping or indexing motor which is controlled by the incremental angle transmitter. The recording chart is advanced as a function of the movement of the generating slide or carriage and in correspondence to a diagram length translation ratio or translation which is pre-selected by means of an encoding switch.

In the following, reference is made to FIG. 1 to explain the conventional measurement of a gear tooth profile. There is depicted therein a gear measuring or testing machine which enables series measurements or testing of such gear tooth profiles. A test or workpiece 1, the gear to be tested, is seated upon a rotatable mandrel or spindle 2. Secured to the same mandrel 2 is a base circle disc 3, the radius of which corresponds to the radius of the base circle of the test specimen 1. The base circle disc 3 is pressed against a generating straight edge 5 by means of a feed carriage or slide 4 and which straight edge 5 is secured to a generating carriage or slide 6. When the generating carriage or slide 6 moves in the direction of the indicated arrow, then the base circle disc 3 rolls without slipping upon the generating straight edge 5 against which it bears under spring pressure. During this rolling movement the edge of a feeler or sensor 8 which is arranged at a sensor or measuring slide 7 is resiliently pressed against the tooth flank to be inspected of the test specimen 1. The edge of the feeler or sensor 8 is, then, located exactly above the edge of the generating straight edge 5. If the flank profile of the gear tooth is involute-shaped, the feeler 8 remains in its position. However, if there exist deviations from the involute shape, then the feeler 8 will be laterally deflected by the amount of such deviation. The feeler deflections are processed by an electronic measuring and recording device 9 and recorded on a suitable diagram or chart paper 10.

By means of a gear measuring machine or tester of such kind the measurements should be carried out at as high a measuring speed as possible (i.e. at as high a rolling speed as possible). The measuring or testing speed, however, is limited by the maximum possible recording speed (i.e. by the maximum possible paper feed rate) of the measuring and recording device 9 as will be considered in more detail further below.

The measuring or testing movements are controlled by actuating one single lever 12. The lever 12 is mounted at the control console of the gear measuring or testing machine at a location which is readily accessible for the operator. The actuation lever 12 may be pivoted in four directions (of which only 2 are shown for better clarity in FIG. 1). By such adjustment the direction of movement may be selected and the speed of the measuring carriage or slide (either the generating carriage or slide 6 or the vertical carriage or slide 11) may be adjusted continuously or infinitely from 0 to maximum speed. After the test specimen 1 including the associated base circle disc 3 has been mounted in the gear measuring or testing machine and after the feeler 8 has been positioned manually into the starting position for performing the testing or measurement work, the operator moves the lever 12 from the starting position into a stop abutting position in which the rolling speed will be maximum. The gear measuring or testing machine, however, can be operated at maximum rolling speed only if this is compatible with the maximum possible paper feed rate. For further illustration of this problem, reference is additionally made to FIG. 2 which shows the conventional profile measuring control arrangement in solid lines (and the profile measurement control device 13 according to the invention in broken or phantom lines).

The pivotable actuation lever 12 acts on the slider or movable tap SP1 of a potentiometer P1 and thereby changes the voltage tapped-off therefrom by means of which the drive motor 16" of the generating carriage 6 is controlled. This drive motor 16" moves the generating straight edge 5 which, then, sets the base circle disc 3 into rotation. The rotation of the base circle disc 3 is detected by an incremental angle transmitter 15 supplying pulses which are proportional to the angle of rotation thereof and by means of which a stepping or indexing motor 16' is controlled which is contained in the measuring and recording device 9 and which effects the paper feed. Additionally, there is provided a device or means 17 for preselecting the diagram length translation ratio or translation and which acts upon the paper feed motor 16' and affects the number of pulses supplied thereto per unit of time in such a way that the paper is truly advanced according to the scale selected by the diagram length translation in correspondence to the measuring movements of the feeler.

The path of the lever 12 for adjusting the rolling speed is affected by the radius of the base circle disc 3 selected and by the selected diagram length translation. If a smaller gear is measured or tested and thus, a smaller base circle disc 3 is used, then the rotational speed of the base circle disc 3 will be increased although the speed of the generating straight edge 5 is the same. Therefore, the incremental angle transmitter 15 will deliver more pulses per unit of time, so that the stepping motor 16' executes a more extensive movement per unit of time, thus providing for a higher paper feed rate. There is, however, an optimum speed for the paper feed rate which should not be exceeded. In the case of using a smaller base circle disc 3 the lever 12, therefore, may not be adjusted so as to engage the stop. Correspondingly the same is true for the selection of the diagram length translation. Therefore, for example, the ratios 1:2, 1:1, 2:1, 4:1, 5:1, 8:1, 10:1 and 20:1 to the rotational angle may be preselected. If the ratio increases, the paper feed rate will increase. In case that the optimum value of the paper feed rate, for example, is obtained at a ratio of 4:1, the lever 12 again may not be adjusted so as to abut the stop at greater values of this ratio.

Thus, it is up to the dexterity and the feeling or "touch" of the operator how far the lever 12 may be adjusted to attain the optimum paper feed rate. This is of disadvantage in the series inspection or testing of gears of different sizes, since the operator either already will have to know the relevant position of the lever 12 or will have to find the same by trial and error. If notwithstanding the same the operator happens to move the lever 12 too far, the measuring and recording device 9 will simply stop recording because the maximum possible paper feed rate is exceeded. Such a profile measuring method, therefore, requires specially trained or educated operating personnel.

SUMMARY OF THE INVENTION

Therefore, with the foregoing in mind, it is a primary object of the present invention to provide a new and improved profile measurement control for a gear measuring or testing machine in which, independently of the preselected diagram length translation and the base circle radius, the optimum paper feed rate always can be readily adjusted.

Another and more specific object of the present invention aims at the provision of a new and improved profile measurement control for a gear measuring machine in which the optimum paper feed rate of the measuring and recording device is always obtained by adjusting the lever to engage the stop independently of the preselected diagram length translation and the base circle radius.

Now in order to implement these and still further objects of the invention, which will become more readily apparent as the description proceeds, the profile measurement control or control apparatus of the present development is manifested by the features that, there are provided a potentiometer which includes a slider or movable tap or the like coupled to the pivotable lever; a voltage attenuating or attenuation circuit including inputs and an output to allow for said diagram length translation, the inputs of which are connected to the slider of the potentiometer and to the output of the encoding switch; a first change-over or reversing switch including a switching element and two switch terminals or contacts, one of the terminals or contacts being connected to the slider of the potentiometer and the other one to the output of the voltage attenuating circuit and the switch element being switched over from one of the terminals or contacts to the other by means of the encoding switch at a predetermined diagram length translation; and a resistor or resistance network having an input and an output and designed to vary the output voltage proportionally to the radius of the base circle disc, the input of the resistor network being connected to the common terminal of the first change-over switch and the output thereof to the drive motor driving the generating carriage or slide.

By means of the profile measurement control or control apparatus according to the invention, the voltage tapped-off from the potentiometer and adjusted by means of the lever is changed, prior to being supplied to the drive motor of the generating carriage, in such a way that independently of the radius of the selected base circle disc and the preselected diagram length translation an optimum diagram or recording paper transport will result even when the lever engages the stop. If, for instance, the diagram length translation is smaller than 5:1, the first change-over or reversing switch is adjusted such that the voltage tapped-off the potentiometer is fed immediately to the input of the resistor or resistance network. If the diagram length translation is equal to or greater than 5:1, then the first change-over switch is adjusted such that the voltage tapped-off the potentiometer is supplied to the input of the resistor network via the voltage attenuating circuit. The voltage attenuating circuit reduces the voltage supplied to the resistor network proportionally to the preselected diagram length translation. Additionally, the resistor or resistance network changes the voltage signal which is finally supplied to the drive motor of the generating carriage or slide proportionally to the radius of the selected base circle disc. If the radius of the base circle disc increases, the resistance of the resistor network will be increased proportionally thereto, whereby the voltage supplied to the drive motor of the generating carriage or slide is increased, so that the rotational speed of the base circle disc in relation to the radius thereof remains constant. Correspondingly, a smaller radius of the base circle disc results in a smaller speed of the generating carriage or slide and vice versa. By merely adapting the speed of the generating carriage or of the generating straight edge, respectively, it will thus be achieved that the rotational·speed of the base circle disc does not exceed a defined value for an optimum paper feed rate. The voltage attenuation and variation is effected such that the optimum paper feed rate will always be present if the lever is moved to engage the stop.

According to a further development of the profile measurement control according to the invention, the voltage attenuating circuit includes a second and a third change-over or reversing switch and an operational amplifier having two inputs and an output. The second change-over or reversing switch has a common terminal connected to the slider of the potentiometer, one switch contact or terminal connected via a first resistor and another switch contact or terminal connected via a second resistor to one of the inputs of the operational amplifier, and a switching element designed to be switched by the encoding switch via one of the inputs of the voltage attenuating circuit. The third change-over switch has a common terminal connected to one of the inputs of the operational amplifier, one switch contact or terminal connected via a third resistor and another switch contact connected via a fourth resistor to the output of the operational amplifier, and a switching element designed to be switched by the encoding switch via a further input of the voltage attenuating circuit. The output of the operational amplifier is connected to the output of the voltage attenuating circuit and a dropping resistor is wired to the other input of the operational amplifier. Consequently, the voltage attenuation depending on the selected diagram length translation ratio can be achieved constructionally very simply in a circuit including two change-over or reversing switches, an operational amplifier and four resistors.

In a further development of the profile measurement control according to the invention, a voltage inverter is interconnected between the slider or tap of the potentiometer and the common terminal of the second change-over or reversing switch, and the one input of the operational amplifier forms the inverting input thereof. By additionally providing a voltage inverter at the input of the voltage attenuating circuit the sign of the input voltage at the voltage attenuating circuit can be changed so as to be suitable for the operational amplifier.

According to another development of the profile measurement control according to the invention, the first change-over or reversing switch is switched to the other one of the switch contacts or terminals by means of the encoding switch at values of the diagram length translation above the predetermined value thereof, and the encoding switch supplies binary coded data corresponding to the respectively adjusted diagram length translation values which result in the following resistance ratios for voltage attenuation or reduction:

| Diagram Length Translation | Encoding Switch DT1 | Encoding Switch DT2 | Position of Change-over Switch 24 | Position of Change-over Switch 25 | Resistance Ratio | |
|---|---|---|---|---|---|---|
| 5:1 | 0 | 0 | K1 | K1 | $\frac{\text{first resistor}}{\text{third resistor}}$ | $= \frac{30}{22}$ |
| 8:1 | 1 | 0 | K2 | K1 | $\frac{\text{second resistor}}{\text{third resistor}}$ | $= \frac{51}{22}$ |
| 10:1 | 0 | 1 | K1 | K2 | $\frac{\text{first resistor}}{\text{fourth resistor}}$ | $= \frac{30}{10}$ |
| 20:1 | 1 | 1 | K2 | K2 | $\frac{\text{second resistor}}{\text{fourth resistor}}$ | $= \frac{51}{10}$ |

With the aforementioned design it is possible for certain diagram length translation ratios, by selecting the resistance values of the resistors contained in the voltage attenuating circuit and by simple switching to suitable resistance ratios, to adjust in a most simple manner the voltage attenuation factors required for the relevant diagram length translation or translation ratio.

A further development of the profile measurement control according to the invention contemplates that the resistor or resistance network includes a fifth resistor, a sixth resistor, a further potentiometer connected as an adjustable resistor and a further operational amplifier including an input and a feedback path or loop connected thereto. The fifth resistor is interconnected between the common terminal of the first change-over switch and the one input of the further operational amplifier; the sixth resistor and the further potentiometer are connected in series into the feedback path or loop, the slider or movable tap of the further potentiometer being adjustable by means of the feed carriage in correspondence to the radius of the base circle disc. A further dropping resistor is wired to the other input of the further operational amplifier. The output of the further operational amplifier forms the output of the resistor network and supplies a voltage which is varied in accordance with the ratio $$\frac{\text{fifth resistor}}{\text{sixth resistor + adjusted potentiometer resistance}}$$

By using two resistors and a potentiometer connected together with one of the resistors in the feedback path or loop of the operational amplifier and including a slider connected to the feed carriage pressing the base circle disc against the generating straight edge, the voltage delivered by the profile measurement control to the drive motor of the generating carriage or slide can thus be increased or decreased in a simple manner in correspondence to the radius of the base circle disc. The increase or decrease of the voltage itself is effected in such a way that, allowing for the resistor ratios in the voltage attenuating circuit, the lever always may be moved to engage the stop for attaining an optimum paper feed rate.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is a detailed circuit diagram of the profile measurement control as shown in FIG. 3 and according to the invention.

DETAILED DESCRIPTION OF THE PREFERRED EMBODIMENTS

Figure 1:
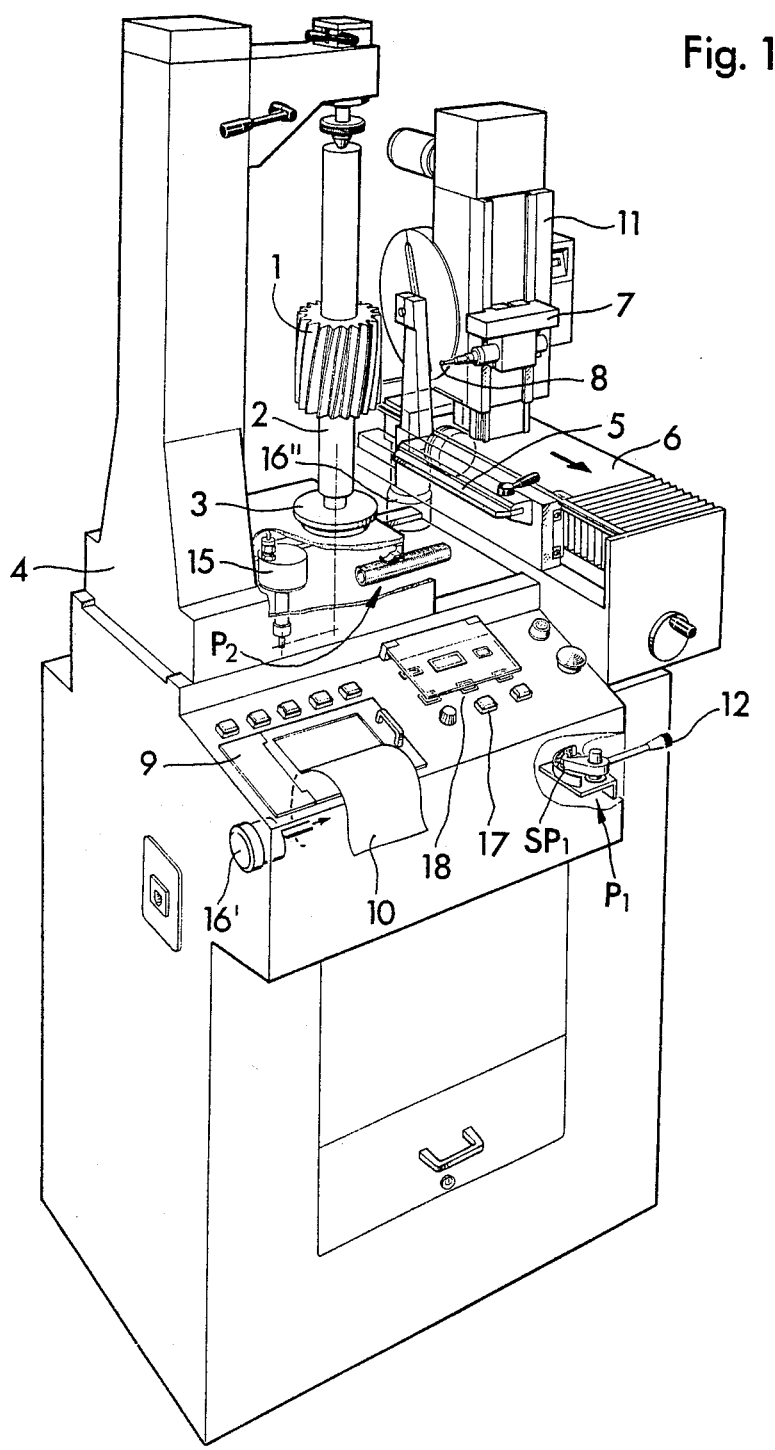
FIG. 1 shows a gear measuring machine or tester provided with the profile measurement control according to the invention.
Figure 2:
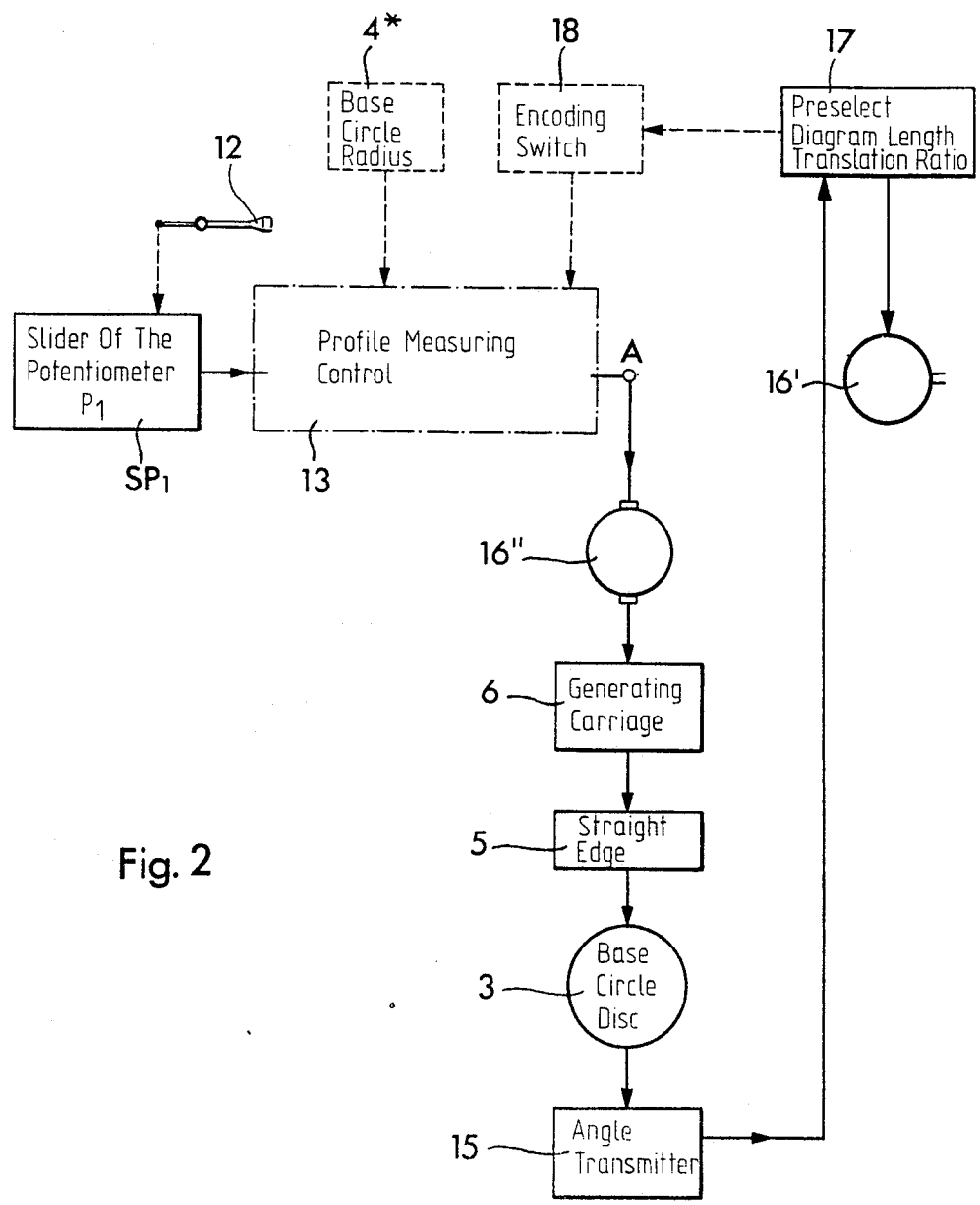
FIG. 2 is an explanatory block circuit diagram showing the arrangement in conventional profile measurements in solid lines and the profile measurement control according to the invention in broken lines.

Describing now the drawings, it is to be understood that in order to simplify the illustration only enough of the design of the profile measurement control or control apparatus and equipment has been shown as needed for those skilled in the art to readily understand the underlying principles and concepts of the present invention. Turning now specifically to FIG. 2 of the drawings, an encoding or coding switch 18 illustrated therein may also be provided immediately in the means or device 17 for preselecting the diagram length translation or may be provided instead thereof. The encoding switch 18 supplies a binary coded value of the preselected diagram length translation or translation ratio to the profile measurement control 13. The same also receives an indication of or data concerning the base circle radius in a manner described in more detail hereinbelow.

Figure 3:
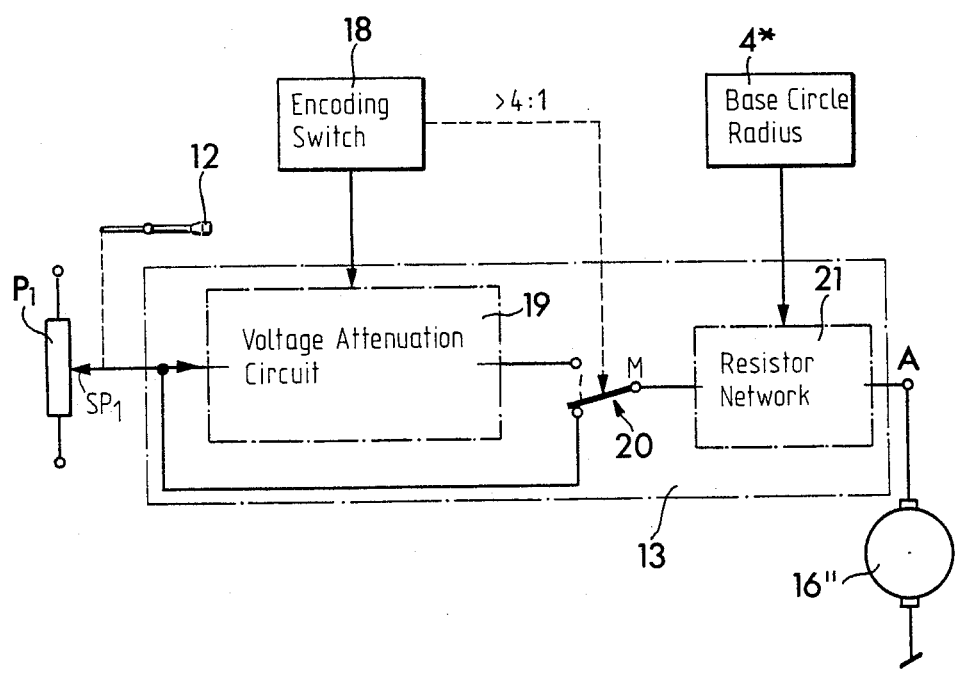
FIG. 3 is a block circuit diagram of the profile measurement control according to the invention.

A comparison of the block circuit diagram of the profile measurement control 13 according to the invention as shown in FIG. 3 with the explanatory diagram of FIG. 2 will show that the preselected diagram length translation and the selected base circle radius 4* directly affect, through the profile measurement control 13, the voltage supplied to the drive motor 16" of the generating carriage or slide 6 via output terminal A. According to FIG. 3, the encoding switch 18, on the one hand, acts on a voltage attenuating or attenuation circuit 19 and, on the other hand, beginning with a well-defined ratio between the diagram length and the rotational angle of the incremental angle transmitter 15 acts upon a first change-over or reversing switch 20, the common terminal M of which is connected to a resistor or resistance network 21. The output A of the resistor network 21 forms the output of the profile measurement control or control apparatus 13 and the base circle radius is fed into the same in a manner described in more detail hereinbelow.

The actuating lever 12, as schematically illustrated in FIG. 3, is connected to the slider or movable tap SP1 of a potentiometer P1 from which the control voltage for the drive motor 16" of the generating carriage or slider 6 is tapped-off. This voltage may be supplied via the first change-over or reversing switch 20 in the lower position thereof immediately to the resistor network 21 and in the upper position thereof to the resistor network 21 via the voltage attenuating circuit 19.

In the following the structure of the profile measurement control 13 now will be described in detail with reference to FIG. 4 of the drawings. An input T3 of the voltage attenuating or attenuation circuit 19 is connected via a resistor R1 to an inverting input of an operational amplifier 22, the non-inverting input of which is wired or connected to a dropping resistor RV1. A resistor R2 having the same resistance value as the resistor R1 is connected into the feedback circuit or loop of the operational amplifier 22, in order to interconnect the output thereof with the non-inverting input. In this manner the operational amplifier 22 is connected as a voltage inverter which applies the correct sign to the voltage received at the input T3 for supplying the same to the inverting input of an operational amplifier 23. The output of the operational amplifier 22 is connected to the common terminal M of a second change-over or reversing switch 24, the switch contact or terminal K1 of which is connected via a first resistor R4 to an inverting input of the operational amplifier 23 and the switch contact or terminal K2 of which is connected via a second resistor R3 to the same inverting input. The non-inverting input of the operational amplifier 23 is wired or connected to a dropping resistor RV2. The not particularly referenced switching element of the second change-over or reversing switch 24 is switched-over by means of the encoding switch 18 via an input DT1. The inverting input of the operational amplifier 23 is connected to the common terminal M of a second change-over or reversing switch 25. The not particularly referenced switching element of the second change-over or reversing switch 25 is switched by means of the encoding switch 18 via an input DT2. The switch contact or terminal K1 is connected to the output of the operational amplifier 23 via a third resistor R6 and the switch contact or terminal K2 is connected via a fourth resistor R5 to the same output. Thus, the first and second resistors or resistances R3 and R4 are connected in the input circuit of the operational amplifier 23 and these resistors may be selectively connected into the circuit by switching-over the second change-over switch 24. The third and the fourth resistors or resistances R5 and R6, respectively, are arranged in the feedback or loop circuit of the operational amplifier 23 and may be connected by appropriately selectively switching-over the third change-over or reversing switch 25.

The deflection of the lever 12 is transformed into a voltage by means of the potentiometer P1. If the diagram length translation in the embodiment as presently described is smaller than 5:1, then the first change-over or reversing switch 20 is switched to engage the switch contact K1 and the voltage tapped-off the potentiometer P1 is supplied directly to the input of the resistor or resistance network 21. If in the selected embodiment of the diagram length translation or translation ratio is equal to or greater than 5:1, then the first change-over switch 20 is switched so as to engage switch contact K2 and the voltage tapped-off the potentiometer P1 is conducted through the operational amplifiers 22 and 23. As already explained, the operational amplifier 22 merely represents a voltage inverter, and thus, merely changes the sign of the voltage. Contrary thereto, the operational amplifier 23 is connected in such a way, that four possibilities of voltage attenuation are offered. The data, i.e. combinations of logic signal values or states 0 and 1, corresponding to the preselected diagram length translation ratio are supplied via the encoding switch 18 and the inputs DT1 and DT2 to the voltage attenuating circuit 19. The four possible voltage reductions or attenuations are indicated in the following table:

| Diagram Length Translation | Encoding Switch | | Change-over Switch Position | | Resistor Ratio |
| | DT1 | DT2 | 24 | 25 | |
|---|---|---|---|---|---|
| 5:1 | 0 | 0 | K1 | K1 | R4:R6 |
| 8:1 | 1 | 0 | K2 | K1 | R3:R6 |
| 10:1 | 0 | 1 | K1 | K2 | R4:R5 |
| 20:1 | 1 | 1 | K2 | K2 | R3:R5 |

In the embodiment as described the following resistance values have been used for the resistors or resistances R3 to R6:

R3=51 kΩ, R4=30 kΩ, R5=10 kΩ and R6=22 kΩ.

Thus, the encoding switch 18 in accordance with the table as given above will render the binary combinations 1/0 in the case of a diagram length transmission or translation of 8:1 which will cause the second change-over or reversing switch 24 to be switched so as to engage switch contact K2 and the third change-over switch 25 to be switched so as to engage the switch contact K1, resulting in a resistance ratio of 51 kΩ over 22 kΩ, by means of which the voltage supplied to the input of the resistor network 21 is attenuated.

In accordance with FIG. 4, the resistor or resistance network 21 includes at an input side thereof a fifth resistor R7 connected to the inverting input of a further operational amplifier 26, the non-inverting input of which is wired or connected to a dropping resistor RV3. A feedback circuit or loop interconnecting the output of the operational amplifier 26 with the inverting input thereof includes a further potentiometer P2 and a sixth resistor R8 connected in series therewith. The slider or movable tap SP2 of the further potentiometer P2 is connected to the feed carriage or slide 4 which presses the base circle disc 3 against the generating straight edge 5. In the embodiment as shown the following values have been used for the resistors or resistances R7, R8 and P2:

R7=20 kΩ, R8=2.7 kΩ and P2=20 kΩ.

The voltage supplied via the first change-over or reversing switch 20 to the input of the resistor network 22, then, has a value at the output A thereof which is in the ratio of the fifth resistor R7 to the sum of the sixth resistor R8 plus the variable resistance value of the potentiometer P2. The variable resistance of the potentiometer P2 corresponds to the position of the feed carriage or slide 4, which corresponds to the radius of the respectively used base circle disc 3. When the radius of the base circle disc 3 is small, i.e. at a small base circle diameter, the variable resistance value of the potentiometer P2 is small. The voltage existing between the common terminal M of the first change-over switch 20 and the output A thus is attenuated, resulting in a correspondingly lower speed of the generating carriage or slide 6. Since the generating carriage or slide 6 drives the base circle disc 3 via the generating straight edge 5, the rotational speed thereof is related to its radius and a small radius corresponds to a small speed of the generating carriage 6, whereas a large radius corresponds to a high speed of the generating carriage 6, so that the rotational speed of the base circle disc 3 driven by the generating carriage or slide 6 remains constant. It is thereby ensured that the pulse frequency supplied by the incremental angle transmitter 15, i.e. the rotational speed of the base circle disc 3, does not exceed a predetermined value which is required for an optimum paper feed rate.

The foregoing discussion and considerations have shown that the operator, after adjusting the preselected diagram length translation at the encoding switch 18 and after selecting the base circle disc 3 in accordance with the test specimen 1, can always adjust the lever 12 so as to engage the stop in order to attain an optimum paper feed rate, and thus, the maximum rolling or measuring speed required for series measurements. If the operator changes the diagram length translation ratio and/or the base circle disc, the profile measurement control will automatically change the voltage supplied to the drive motor 16" of the generating carriage or slide 6 at the output A in such a way that, when the lever is adjusted to engage the stop, again the optimum paper feed rate is present which is associated with the respective combination of diagram length translation and base circle disc radius.

While the change-over or reversing switches 20, 24 and 25 are illustrated symbolically in FIG. 4 as mechanical switches, such switches, in practice, conveniently will be electronic switches. Also, the operational amplifiers 22, 23 and 26, in practice, will be designed as integrated circuits.

| Compilation Of The Circuit Elements Used In The Embodiment As Described: | |
|---|---|
| Potentiometer P1 | 5 kΩ |
| Potentiometer P2 | 20 kΩ |
| Resistors: | |
| R1 | 47 kΩ |
| R2 | 47 kΩ |
| R3 | 51 kΩ |
| R4 | 30 kΩ |
| R5 | 10 kΩ |
| R6 | 22 kΩ |
| R7 | 20 kΩ |
| R8 | 2.7 kΩ |
| RV1 | 22 kΩ |
| RV2 | 15 kΩ |
| RV3 | 10 kΩ |
| Amplifiers: | |
| 22, 23 MC 1458 (Motorola Company) | |
| 26 Power Amplifier PA 12 (Apex Company) | |

While there are shown and described present preferred embodiments of the invention, it is to be distinctly understood that the invention is not limited thereto, but may be otherwise variously embodied and practiced within the scope of the following claims.
ACCORDINGLY;

What we claim is:

1. In a profile measurement control for a gear measuring machine, comprising a pivotable lever for infinitely controlling the direction and speed of a drive motor for driving a generating carriage carrying a generating straight edge at which there rolls essentially without slip a base circle disc coupled to a test specimen and pressed against said generating straight edge by a feed carriage, an incremental angle transmitter coupled to said base circle disc, measuring and recording means including a recording chart and a recording chart feed comprising a stepping motor controlled by said angle transmitter, an encoding switch having outputs for preselecting a defined diagram length translation ratio, said recording chart being advanced as a function of to the movement of said generating carriage and said diagram length translation ratio preselected at said encoding switch, the improvement which comprises;
   a potentiometer including a slider coupled to said pivotable lever;
   a voltage attenuating circuit including inputs and an output for taking into account said diagram length translation ratio;
   said inputs being connected to said slider of said potentiometer and to said outputs of said encoding switch, respectively;
   a first change-over switch including a switching element and two switch contacts;
   one of said two switch contacts being connected to said slider of said potentiometer, the other one of said two switch contacts being connected to said output of said voltage attenuating circuit, and said switching element being switched over from one of said two switch contacts to the other one thereof by means of said encoding switch at a predetermined diagram length translation ratio;
   a resistor network having an input and an output and serving to vary an output voltage of the profile measurement control proportionally to the radius of said base circle disc; and
   said input of said resistor network being connected to a common terminal of said first change-over switch and said output thereof being connected to said drive motor of said generating carriage.

2. The control as defined in claim 1, wherein:
   said voltage attenuating circuit comprises a second change-over switch and a third change-over switch and an operational amplifier having two inputs and an output;
   said second change-over switch having a common terminal operatively connected to said slider of said potentiometer, a first switch contact connected via a first resistor and a second switch contact connected via a second resistor to one of said two inputs of said operational amplifier, and a switching element which can be switched by said encoding switch via one of said inputs of said voltage attenuating circuit;
   said third change-over switch having a common terminal connected to said one of said two inputs of said operational amplifier, a first switch contact connected via a third resistor and a second switch contact connected via a fourth resistor to said output of said operational amplifier, and a switching element which can be switched by said encoding switch via a further one of said inputs of said voltage attenuating circuit;
   said output of said operational amplifier being connected to said output of said voltage attenuating circuit; and
   a dropping resistor is connected to the other one of said two inputs of said operational amplifier.

3. The control as defined in claim 2, further including:
   a voltage inverter interconnected between said slider of said potentiometer and said common terminal of said second change-over switch; and
   said one of said two inputs of said operational amplifier being the inverting input thereof.

4. The control as defined in claim 2, wherein:
   said first change-over switch is switched to said other one of said two switch contacts thereof by means of said encoding switch at values of said diagram length translation ratio above said predetermined value thereof; and said encoding switch supplying binary coded data corresponding to the momentarily adjusted diagram length translation ratio resulting in the following resistance ratios for voltage attenuation:

| Diagram Length Translation | Encoding Switch DT1 | DT2 | Position of Change-over Switch 24 | 25 | Resistance Ratio | |
|---|---|---|---|---|---|---|
| 5:1 | 0 | 0 | K1 | K1 | $\frac{\text{first resistor}}{\text{third resistor}} =$ | $\frac{30}{22}$ |
| 8:1 | 1 | 0 | K2 | K1 | $\frac{\text{second resistor}}{\text{third resistor}} =$ | $\frac{51}{22}$ |
| 10:1 | 0 | 1 | K1 | K2 | $\frac{\text{first resistor}}{\text{fourth resistor}} =$ | $\frac{30}{10}$ |
| 20:1 | 1 | 1 | K2 | K2 | $\frac{\text{second resistor}}{\text{fourth resistor}} =$ | $\frac{51}{10}$ |

5. The control as defined in claim 3, wherein:
said first change-over switch is switched to said other one of said two switch contacts thereof by means of said encoding switch at values of said diagram length translation ratio above said predetermined value thereof; and
said encoding switch supplying binary coded data corresponding to the momentarily adjusted diagram length translation ratio resulting in the following resistance ratios for voltage attenuation:

| Diagram Length Translation | Encoding Switch DT1 | DT2 | Position of Change-over Switch 24 | 25 | Resistance Ratio | |
|---|---|---|---|---|---|---|
| 5:1 | 0 | 0 | K1 | K1 | $\frac{\text{first resistor}}{\text{third resistor}} =$ | $\frac{30}{22}$ |
| 8:1 | 1 | 0 | K2 | K1 | $\frac{\text{second resistor}}{\text{third resistor}} =$ | $\frac{51}{22}$ |
| 10:1 | 0 | 1 | K1 | K2 | $\frac{\text{first resistor}}{\text{fourth resistor}} =$ | $\frac{30}{10}$ |
| 20:1 | 1 | 1 | K2 | K2 | $\frac{\text{second resistor}}{\text{fourth resistor}} =$ | $\frac{51}{10}$ |

6. The control as defined in claim 1, wherein:
said resistor network comprises a first resistor, a second resistor, an adjustable potentiometer connected as an adjustable resistor and an operational amplifier including a first input and a feedback path connected thereto, a second input and an output;
said first resistor being interconnected between said common terminal of said first change-over switch and said first input of said operational amplifier;
said second resistor and said adjustable potentiometer being series connected into said feedback path;
a slider of said adjustable potentiometer being adjustable by means of said feed carriage as a function of said radius of said base circle disc;
a dropping resistor connected to said second input of said further operational amplifier; and
said output of said operational amplifier forming said output of said resistor network and delivering a voltage which varies in accordance with the ratio $$\frac{\text{first resistor}}{\text{second resistor} + \text{adjusted potentiometer resistance}}$$

* * * * *